No. 11,955. Reissued Dec. 10, 1901.
W. B. KEEFER.
INGRAIN CARPET FABRIC.
(Application filed Oct. 28, 1901.)
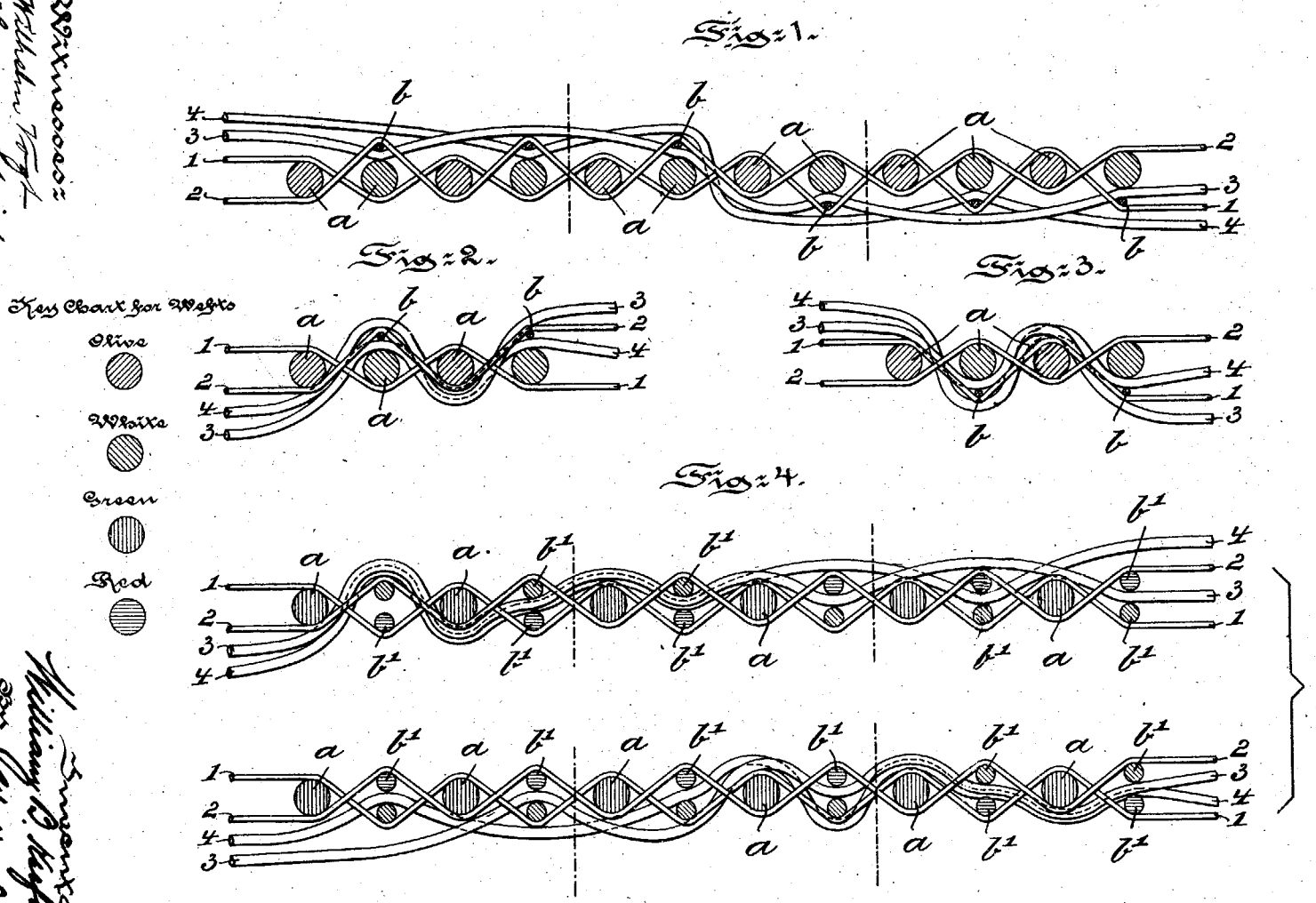
Witnesses:
Wilhelm Voigt
Thomas M. Smith.
Inventor:
William B. Keefer,
By J. Walter Douglas
Attorney.

UNITED STATES PATENT OFFICE.

WILLIAM B. KEEFER, OF PHILADELPHIA, PENNSYLVANIA.

INGRAIN CARPET FABRIC.

SPECIFICATION forming part of Reissued Letters Patent No. 11,955, dated December 10, 1901.

Original No. 673,503, dated May 7, 1901. Application for reissue filed October 28, 1901. Serial No. 80,337.

*To all whom it may concern:*

Be it known that I, WILLIAM B. KEEFER, a citizen of the United States, residing at the city of Philadelphia, in the county of Philadelphia and State of Pennsylvania, have invented certain new and useful Improvements in Ingrain Carpet Fabrics, of which the following is a specification.

My invention has relation to a woven substantially one-plane ingrain carpet fabric, and in such connection it relates to the arrangement of the figuring and binding warp-threads with relation to the figuring and binding weft-threads in the fabric.

The principal object of my invention is to produce a substantially one-plane ingrain carpet fabric having two acceptable faces adapted to be alternately ornamented by additional figuring warp-threads and to have the solidity and apparent thickness of the ordinary two-plane ingrain carpet, but costing much less to produce.

My invention consists of a substantially one-plane ingrain carpet fabric having the main weft-threads bound separately in sheds by two binding warp-threads and having two acceptable faces, each alternate shed containing in addition to the main weft-threads a binding or a combined binding and figuring weft-thread and both faces of the fabric being alternately ornamented by figuring warp-threads united to the face which they are designed to ornament by the additional binding or combined binding and figuring weft-threads.

The nature and scope of my invention will be more fully understood from the following description, taken in connection with the accompanying drawings, forming part hereof, in which—

Figure 1 is a longitudinal sectional view of a portion of a fabric embodying main features of my invention. Figs. 2 and 3 are views similar to Fig. 1, but illustrating other effects in the fabric; and Fig. 4 is a view similar to Figs. 1, 2, and 3, but illustrating a modified form of fabric.

Referring to Figs. 1, 2, and 3 of the drawings, the main weft-threads *a* are separately arranged in sheds and bound by the comparatively thin binder warp-threads 1 and 2. Each alternate shed contains, in addition to the main weft-thread *a*, a binder weft-thread *b*. The faces of the fabric thus formed are equally acceptable and are ornamented by figuring warp-threads 3 and 4. In the fabric illustrated in the drawings these figuring warp-threads 3 and 4 are black, although it is obvious that they may, if desired, be colored, as preferred.

In the ornamentation of the fabric the design or figures are formed on alternately the front or rear of the fabric. In the design illustrated in Fig. 1 the figuring warp-threads 3 and 4 are first used to ornament the upper face of the fabric, the figure or ornamentation extending over six weft-threads *a*, and then the warp-threads 3 and 4 are caused to traverse the weft-threads *a* and to ornament the lower face of the fabric, the figure or pattern extending under six weft-threads *a*. It is obvious, however, that the extent of the figure or pattern can be varied at will, providing the figuring warp-threads are properly tied to the surface which they are to ornament. Thus in Figs. 2 and 3 the two warp-threads 3 and 4 appear in alternate sheds upon the rear and face of the fabric, and hence float either under or over one weft-thread *a*. To thus tie the figuring warp-threads, the binder weft-threads *b* are introduced into alternate sheds, and in the preferred manner of binding or tying (illustrated in Fig. 1) the warp-threads 3 first pass over a weft-thread *a*, then under a binder *b* in the next shed, then over the remaining two wefts *a* in the first set or weave containing six picks—namely, four of weft *a* and two of binder *b*. The warp-threads 4, however, in this set or weave first pass over four wefts *a* and the first binder *b* and under the second binder *b*. It will thus be seen that one warp-thread 3 is bound to the surface by the first binder *b*, while the warp-thread 4 is bound by the second binder *b* of the series. In the next set or weave the two warp-threads 3 and 4 both pass over the first two wefts *a* and then traverse the fabric and pass under the final two wefts *a* to ornament the back of the fabric. In this set the thread 3 passes under the first binder *b* of the set and above the second binder of said set, whereas the thread 4 passes over the first and under the second binder in said set. In the third set the course of threads 3 and 4 is the reverse of the course taken by the threads 3 and 4 in the first set (illustrated in Fig. 1)—that is to say, both threads 3 and 4 pass under all of the wefts *a*, the thread 3 being bound by the second binder in the set, whereas the thread 4 is bound by the first binder in said set. In the completed fabric the figuring warp-threads 3 and 4 will both be tied by a corresponding number of binder weft-threads *b*. When both warp-threads 3 and 4 are to float under and over a single weft-thread *a*, as in Figs. 2 and 3, the binder weft-thread *b* is inclosed between the two warp-threads 3 and 4, and one of said warp-threads 3 or 4 is inclosed between a binder weft-thread *b* and a weft-thread *a*.

In Fig. 4 a similar arrangement of the fabric hereinbefore described is illustrated, the main changes or modifications consisting in replacing the binder weft-threads *b* of Figs. 1, 2, and 3 by a series of combined binding and figuring weft-threads *b'* and in manipulating said weft-threads *b'* in conjunction with the warp threads 3 and 4 to produce other coloring or figuring effects not possible in the fabric illustrated in Figs. 1, 2, and 3.

In all the figures the main weft-threads *a* are colored olive, white, green, and red, according to the key-chart. In Fig. 4 the binder weft-threads *b'* are illustrated as colored white and red. These wefts *a* and *b'* may, however, be of any other colors, as desired.

Having thus described the nature and object of my invention, what I claim as new, and desire to secure by Letters Patent, is—

1. A substantially one-plane ingrain carpet fabric having two acceptable faces, a series of main weft-threads bound separately into sheds by two binder warp-threads, an additional weft-thread included in alternate sheds, and figuring warp-threads adapted to ornament the faces of the fabric and to be bound to said faces by the additional weft-threads.

2. A substantially one-plane ingrain carpet fabric having two acceptable faces, a series of main weft-threads bound separately into sheds by two binder warp-threads, an additional figuring weft-thread included in alternate sheds, and figuring warp-threads adapted to ornament the faces of the fabric and to be bound to said faces by the additional figuring weft-threads.

In testimony whereof I have hereunto set my signature in the presence of two subscribing witnesses.

WILLIAM B. KEEFER.

Witnesses:
J. WALTER DOUGLASS,
THOMAS M. SMITH.